(12) United States Patent
Ochi et al.

(10) Patent No.: US 7,931,848 B2
(45) Date of Patent: *Apr. 26, 2011

(54) METHOD OF PRODUCING SOLID BODY HAVING DEPRESSED PORTION ON SURFACE

(75) Inventors: Atsushi Ochi, Numazu (JP); Harunobu Ogaki, Suntoh-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

This patent is subject to a terminal disclaimer.

(21) Appl. No.: 11/770,246

(22) Filed: Jun. 28, 2007

(65) Prior Publication Data

US 2008/0182024 A1 Jul. 31, 2008

Related U.S. Application Data

(63) Continuation of application No. PCT/JP2007/051847, filed on Jan. 30, 2007.

(30) Foreign Application Priority Data

Jan. 26, 2007 (JP) ................................ 2007-016222

(51) Int. Cl.
C08J 5/18 (2006.01)
(52) U.S. Cl. .................................. 264/331.11; 427/331
(58) Field of Classification Search .................. 264/212, 264/216, 331.11
See application file for complete search history.

(56) References Cited

U.S. PATENT DOCUMENTS

| 5,238,636 | A | * | 8/1993 | Furukawa et al. | 264/41 |
| 7,413,840 | B1 | | 8/2008 | Ogaki et al. | |
| 7,629,102 | B2 | * | 12/2009 | Ochi et al. | 430/127 |
| 2006/0229428 | A1 | * | 10/2006 | Shaikh et al. | 528/272 |

FOREIGN PATENT DOCUMENTS

| EP | 1 983 373 A1 | 10/2008 |
| EP | 1 983 376 A1 | 10/2008 |

(Continued)

OTHER PUBLICATIONS

Baohui Zhao et al., "Fabrication of honeycomb ordered polycarbonate films using water droplets as template," Thin Solid Film, vol. 515, No. 7-8, Nov. 21, 2006, pp. 3629-3634, XP005890764.

(Continued)

*Primary Examiner* — Yogendra N Gupta
*Assistant Examiner* — Robert J Grun
(74) *Attorney, Agent, or Firm* — Fitzpatrick, Cella, Harper & Scinto

(57) ABSTRACT

A method of very inexpensively and stably producing a solid body having a depressed portion on a surface, which is expected to be applied in a variety of industrial fields. This method forms a solid body having a depressed portion on a surface by using a solution at least containing a solvent A, a solvent B and a polymer compound soluble in solvent B, solvent A being a hydrophilic solvent and solvent B being a hydrophobic solvent, the boiling point of solvent A being equal to or higher than the boiling point of solvent B, and the total mass of solvent B being 50% or more of the total mass of the solvents contained in the solution, then solidifying the solution while forming a depressed portion from condensation on the surface of the solution during a process wherein either one or both of the solvent A and solvent B contained in the solution are evaporating.

1 Claim, 7 Drawing Sheets

FOREIGN PATENT DOCUMENTS

| | | |
|---|---|---|
| JP | 01-268733 | 10/1989 |
| JP | 08-311231 | 11/1996 |
| JP | 2001-157574 | 6/2001 |
| JP | 2002-335949 | 11/2002 |
| JP | 2002-347107 | 12/2002 |
| JP | 2006-070254 | 3/2006 |
| JP | 2007-016179 | 1/2007 |
| WO | WO 2006/126735 A1 | 11/2006 |

OTHER PUBLICATIONS

Supplementary European Search Report issued in the corresponding European application No. 07 71 3808, dated Feb. 3, 2010.

* cited by examiner

METHOD OF PRODUCING SOLID BODY HAVING DEPRESSED PORTION ON SURFACE

This application is a continuation of International Application No. PCT/JP2007/051847, filed Jan. 30, 2007, which claims the benefit of Japanese Patent Application No. 2007-016222, filed Jan. 26, 2007.

BACKGROUND OF THE INVENTION

1. Field of the Invention

The present invention relates to a method of producing a solid body having a depressed portion on a surface. More specifically, the present invention relates to a method of producing a solid body having a surface formed with a depressed portion by self assembly from selection of a specific solution composition.

2. Description of the Related Art

Recently, in a variety of fields the shape of solid body surfaces is attracting attention and being researched. For example, Japanese Patent Application Laid-Open No. H01-268733 discloses a method of producing a porous membrane having uses in a filter or the like by condensation fine droplets on a substrate, coating the substrate with a membrane material solution that is immiscible with the fine droplets and drying the thus-formed substrate. Japanese Patent Application Laid-Open No. H08-311231 discloses a method of producing a porous body having a honeycomb structure by coating a cooled polymer solution to condense vapor in the atmosphere on the coated surface. If a plating film is formed on an underlayer having such a surface shape, the anchor effect of the plating film is increased, whereby the plating film adhesion is improved. Japanese Patent Laid-Open Nos. 2001-157574 and 2002-335949 disclose a method of producing a porous body having a honeycomb structure by casting a hydrophobic organic solvent solution of a biodegradable, amphiphilic polymer to condense droplets on the cast solution surface. This porous body is expected to be used in applications in the medical field.

However, with the method disclosed in Japanese Patent Application Laid-Open No. H01-268733, not only does the process become more complicated because a membrane material solution has to be coated after the fine droplets have been condensed on the substrate, but the choice of materials is restricted because the membrane material solution has to be immiscible with the fine droplets. Further, with the method disclosed in Japanese Patent Application Laid-Open No. H08-311231, because a polymer solution has to be cooled, not only is there a risk of coating defects occurring as a result of water mixing into the polymer solution, but countermeasures have to be taken against dew forming in the pipes or the like, and production equipment, such as a cooling apparatus or the like, has to be provided. In addition, with the methods disclosed in Japanese Patent Application Laid-Open Nos. 2001-157574 and 2002-335949, in order for the droplets to condense on the surface, a special amphiphilic polymer is required and the surrounding environment has to be controlled, so that in the case of blowing a high-humidity gas or air, there are the drawbacks that the surface of the cast film may become disorderly, and that the production conditions are equipment are more restricted.

SUMMARY OF THE INVENTION

It is an object of the present invention to provide a method of producing a solid body having a depressed portion on a surface.

The present invention is characterized by using a solution at least comprising a solvent A, a solvent B and a polymer compound soluble in solvent B, solvent A being a hydrophilic solvent and solvent B being a hydrophobic solvent, the boiling point of solvent A being equal to or higher than the boiling point of solvent B, and the total mass of solvent B being 50% or more of the total mass of the solvents contained in the solution, and solidifying the solution while forming an depressed portion from condensation on the surface of the solution during a process wherein either one or both of the solvent A and solvent B contained in the solution are evaporating.

According to the present invention, a very inexpensive and stable method for producing a solid body having a depressed portion on a surface is provided. Especially in the case where a specific solution composition has been selected, it is possible to provide a production method in which a depressed portion on a surface can be self-assembled, or more specifically, a surface shape can be formed without any other controls, just by evaporating the solvent under normal temperature and humidity conditions. The "solid body" having a depressed portion on a surface which is produced according to the present invention may be used in a variety of industrial fields, capable of being used as, for example, a separation membrane, an adsorbent, a catalyst, a carrier, a battery member, a medical material, a lightweight structural material, a cushioning material, an insulation material, an acoustic material, vibration restrained material, an electrically conductive material, a piezoelectric material, a friction material, a slidable material and a low-dielectric material.

Further features of the present invention will become apparent from the following description of exemplary embodiments with reference to the attached drawings.

DESCRIPTION OF THE EMBODIMENTS

Figure 1:
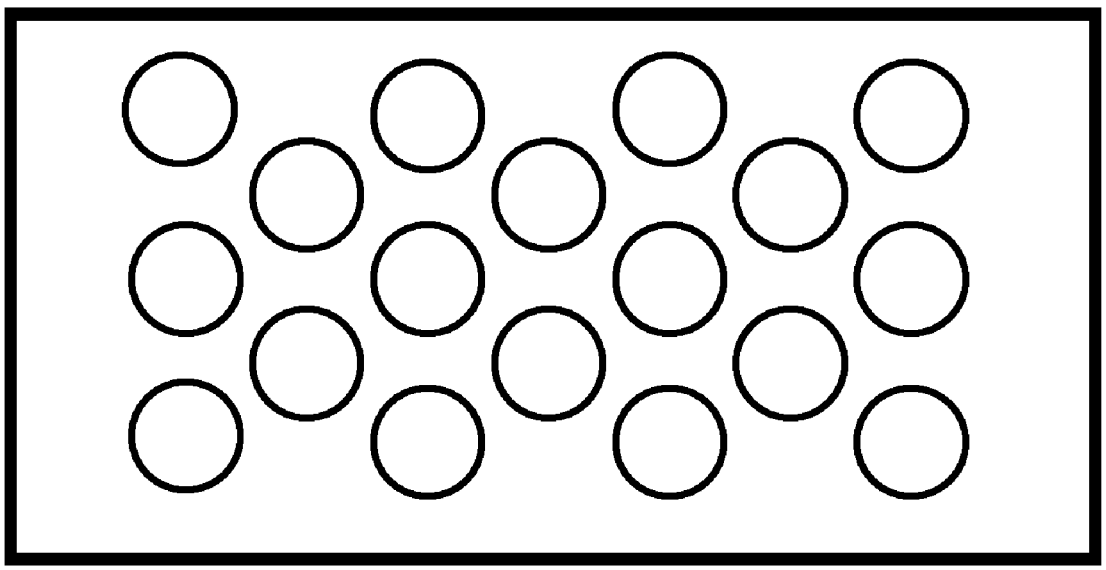
FIG. 1 illustrates one shape as seen from surface observation of the depressed portion according to the present invention.
Figure 2:
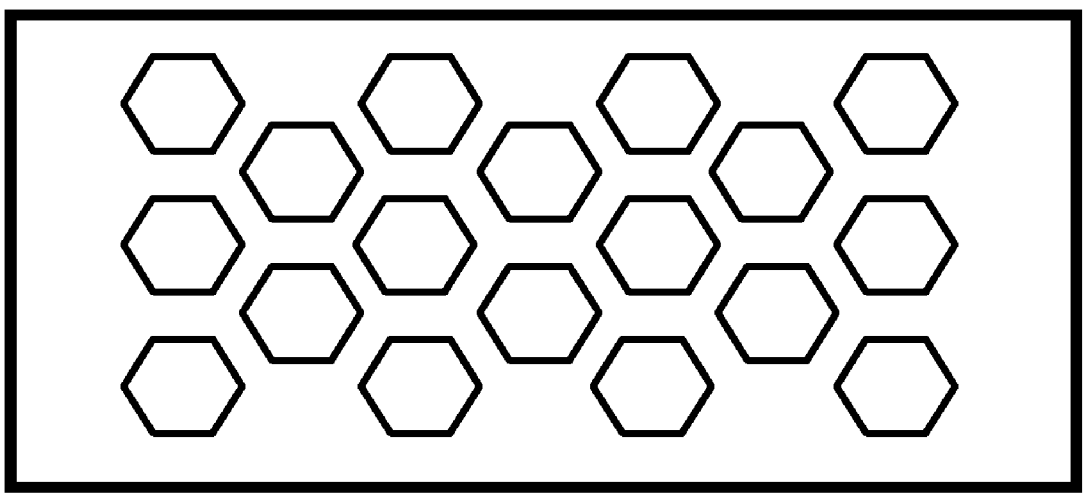
FIG. 2 illustrates another shape as seen from surface observation of the depressed portion according to the present invention.
Figure 3:
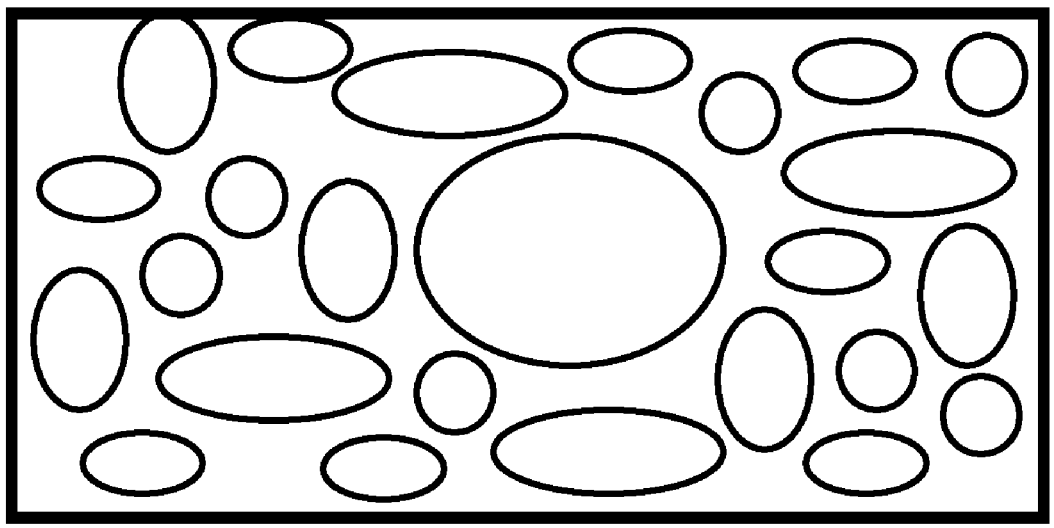
FIG. 3 illustrates another shape as seen from surface observation of the depressed portion according to the present invention.
Figure 4:
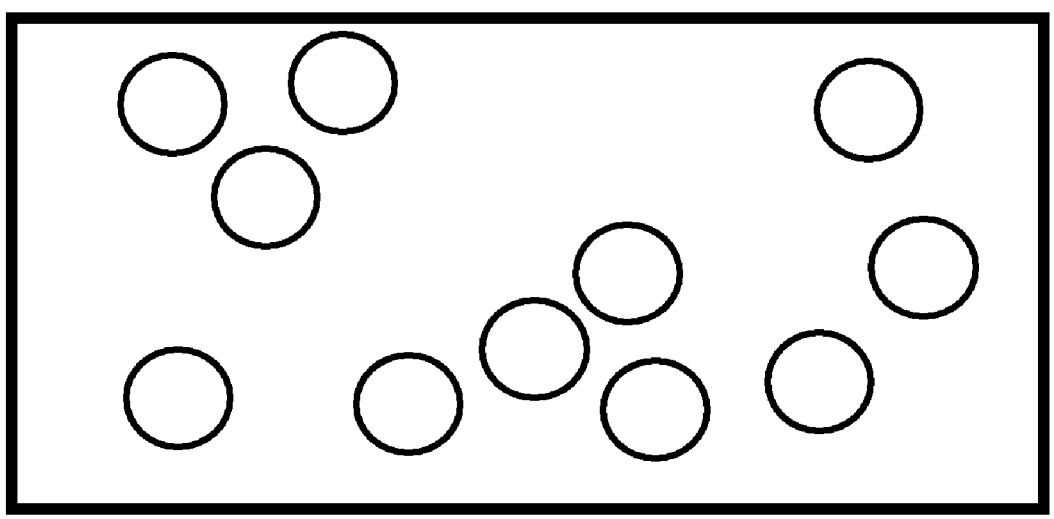
FIG. 4 illustrates another shape as seen from surface observation of the depressed portion according to the present invention.
Figure 5:
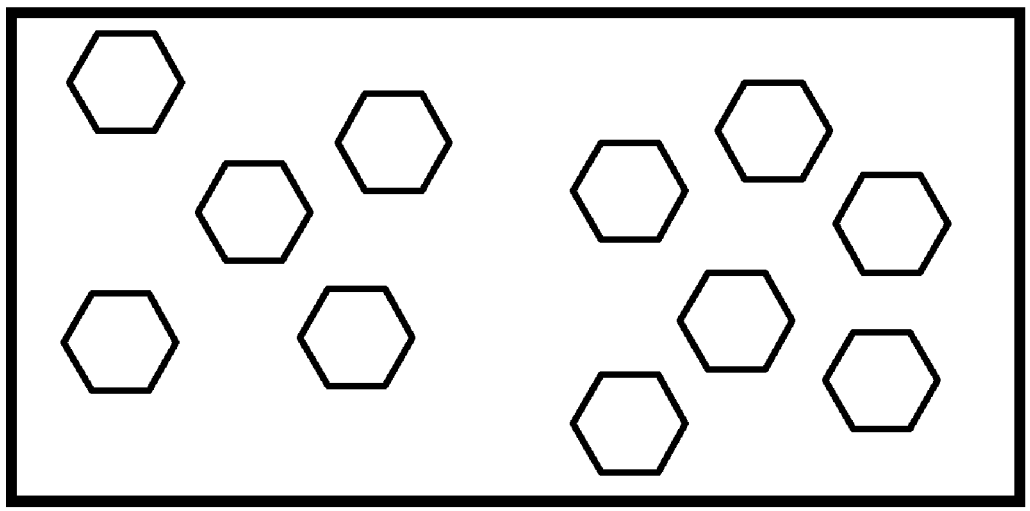
FIG. 5 illustrates another shape as seen from surface observation of the depressed portion according to the present invention.
Figure 6:
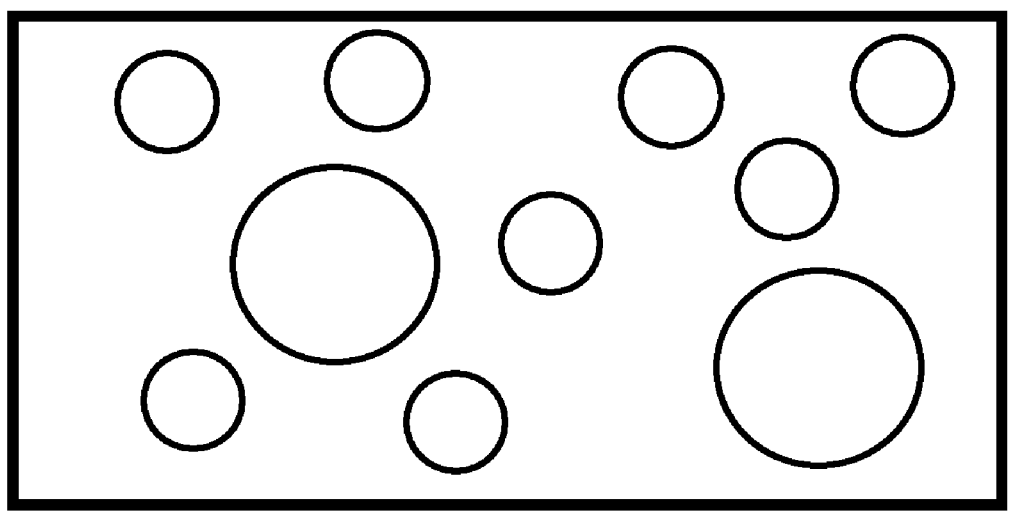
FIG. 6 illustrates another shape as seen from surface observation of the depressed portion according to the present invention.
Figure 7:
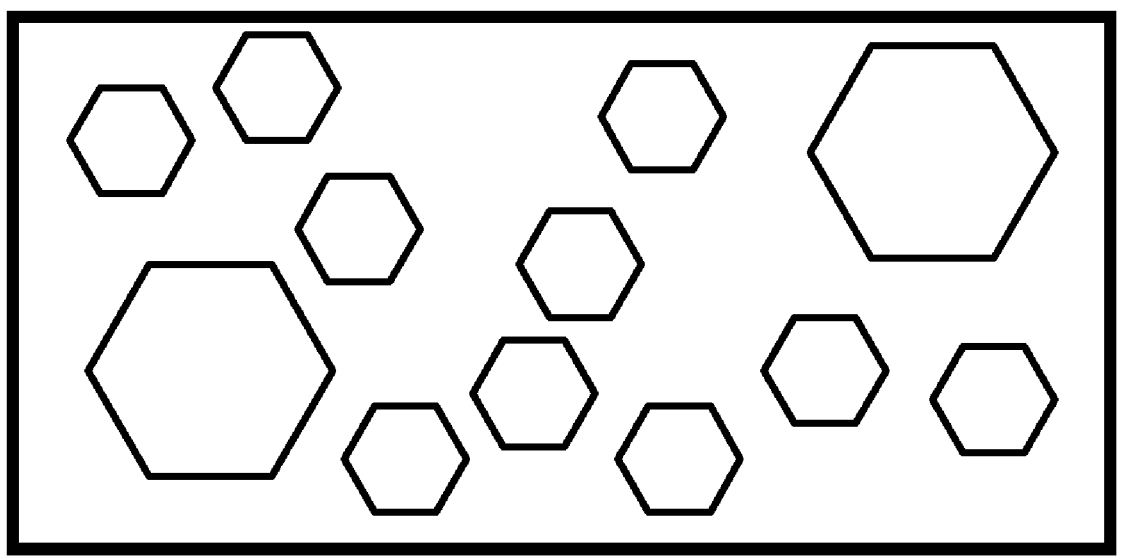
FIG. 7 illustrates another shape as seen from surface observation of the depressed portion according to the present invention.

The present invention will now be described in more detail.

In the present invention, the term "hydrophilic solvent" refers to a solvent which exhibits a large affinity with water, and the term "hydrophobic solvent" refers to a solvent which exhibits a small affinity with water. In the present invention, the distinction between "hydrophilic solvent" and "hydrophobic solvent" is made according to the following experiment and criteria.

(Experiment)

First, under normal temperature and humidity conditions (23±3° C., 50±10% RH), 50 ml of water is measured into a 50 ml measuring cylinder. Next, 50 ml of solvent is measured into a 100 ml measuring cylinder, and this cylinder is charged with the 50 ml of water measured in the previous procedure. The resulting solution is thoroughly stirred with a glass rod until the whole solution is uniform. A lid is put on so that the solvent and the water will not volatilize. The solution is left for a sufficiently long period until air bubbles disappear and the surface boundary becomes stable. The state of the mixed solution in the 100 ml measuring cylinder is observed, and the volume of the aqueous phase is measured.

(Criteria)

In cases where the volume of the aqueous phase is 0 ml or more to 5 ml or less, the solvent is classified as hydrophilic. In cases where the volume of the aqueous phase is 45 ml or more to 50 ml or less, the solvent is classified as hydrophobic. In cases of a uniform monophase, the volume of the aqueous phase is 0, and the solvent is classified as being hydrophilic. In cases beyond these ranges, the solvent is not classified as either being hydrophilic or hydrophobic.

SPECIFIC EXAMPLES

In the above-described experiment, if the solvent is toluene, for example, the volume of the aqueous phase is 50 ml, and thus is classified as hydrophobic. If the solvent is dimethyl sulfoxide (DMSO), a monophase is formed, and thus the volume of the aqueous phase is 0 ml. In this case, the solvent is classified as hydrophilic. Further, if the solvent is 1,1-dimethoxymethane(methylal), the volume of the aqueous phase is 69 ml, and thus the solvent is not classified as either hydrophilic or hydrophobic.

In the present invention, the expression "dipole moment as calculated from geometry optimization based on a semiempirical molecular-orbital calculation", refers to the value of the dipole moment calculated based on the semiempirical molecular orbital calculation program MOPAC using PM3 parameters. In the molecular-orbital method, a wave function used in the Schroedinger's equation is approximated by the Slater type matricial equation or Gauss type matricial equation consisting of a molecular orbital expressed as a linear combination of atomic orbitals, and the molecular orbital constituting the wave function is found by the use of approximation of field, whereby various physical quantities can be calculated as the total energy, the wave function or as expected values of the wave function.

Semiempirical molecular-orbital calculation is a method which, when determining a molecular orbital from a field approximation, shortens the calculation time through approximation using parameters in which various actual experiment values are employed whose integral calculations took time to calculate. The calculations in the present invention were calculated based on the semiempirical molecular orbital calculation program MOPAC using PM3 parameters as semiempirical parameters.

Specifically, using an Indigo2 workstation (manufactured by Silicon Graphics) as the computer, the chemical modeling software Cerius2 is used for dipole moment calculation. The molecular structure of the solvent to be calculated is produced using the Sketching function of the Cerius2. The force-field of this molecular structure is calculated using the Dreding 2.21 program to calculate the charge using the Charge function. The structure is then corrected based on a molecular force field calculation using the Minimizer. PM3 parameters, Geometry Optimization and Dipole are specified in the MOPAC93 program, and corrected structure and dipole moment are calculated for the thus-obtained structure.

The affinity between the solvent and water is related to dipole moment. A hydrophilic solvent tends to have a large dipole moment, while a hydrophobic solvent tends to have a small dipole moment. However, for a highly symmetrical molecular structure, consideration needs to be given to the fact that even a hydrophilic solvent will have a small dipole moment. In the present invention, the tendency is for the hydrophilic solvent A to preferably have a large dipole moment, and the hydrophobic solvent B to preferably have a small dipole moment.

Representative examples of solvent A and solvent B are respectively shown in the following Tables 1 and 2. However, the solvents A and B according to the present invention are not limited to these examples. The term "dipole moment" in Tables 1 and 2 refers to the dipole moment value as calculated in accordance with the above-described method. Further, as a rule, "boiling point" in Tables 1 and 2 refers to the boiling point at atmospheric pressure. In cases where it does not refer to atmospheric pressure, the pressure is clearly specified.

TABLE 1

Representative examples of solvent A

| No. | Name | Chemical formula | Boiling point [° C.] | Dipole moment [D] |
|---|---|---|---|---|
| 1-1 | 1,2-Propanediol | $CH_3CHOHCH_2OH$ | 187 | 0.1 |
| 1-2 | 1,3-Butanediol | $HOCH_2CH_2CHOHCH_3$ | 207 | 0.1 |
| 1-3 | 1,5-Pentanediol | $HO(CH_2)_5OH$ | 242 | 2.8 |
| 1-4 | Glycerol | $CH_2OH$<br>\|<br>$CHOH$<br>\|<br>$CH_2OH$ | 290 | 2.3 |

TABLE 1-continued

Representative examples of solvent A

| No. | Name | Chemical formula | Boiling point [° C.] | Dipole moment [D] |
|---|---|---|---|---|
| 1-5 | 1,2,6-Hexanetriol | CH$_2$OH—CHOH—(CH$_2$)$_3$—CH$_2$OH | 178 (5 mmHg) | 2.2 |
| 1-6 | Tetrahydrofuran |  | 66 | 1.7 |
| 1-7 | Diethylene glycol dimethyl ether | CH$_2$CH$_2$OCH$_3$—O—CH$_2$CH$_2$OCH$_3$ | 160 | 1.2 |
| 1-8 | Propionic acid | CH$_3$CH$_2$COOH | 141 | 1.8 |
| 1-9 | Butyric acid | CH$_3$CH$_2$CH$_2$COOH | 163 | 1.8 |
| 1-10 | γ-Butyrolactone | 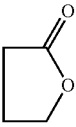 | 204 | 4.2 |
| 1-11 | Diethylene glycol diethyl ether | H$_5$C$_2$OC$_2$H$_4$—O—C$_2$H$_4$OC$_2$H$_5$ | 188 | 1.1 |
| 1-12 | Monoacetin | H$_3$CCOOC$_3$H$_5$(OH)$_2$ | 182 | 3.4 |
| 1-13 | Diacetin | (CH$_3$COO)$_2$C$_3$H$_5$OH | 172 | 4.4 |
| 1-14 | Ethylene carbonate | 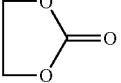 | 238 | 4.6 |
| 1-15 | Propylene carbonate | 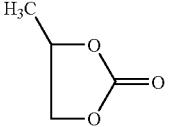 | 242 | 4.8 |
| 1-16 | Triethyl phosphate | PO(OC$_2$H$_5$)$_3$ | 215 | 3.6 |
| 1-17 | β-Picoline | 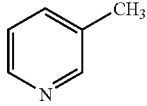 | 144 | 2.1 |
| 1-18 | γ-Picoline | 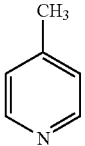 | 145 | 2.3 |
| 1-19 | 2,4-Lutidine | 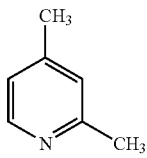 | 157 | 2.2 |

TABLE 1-continued

Representative examples of solvent A

| No. | Name | Chemical formula | Boiling point [°C.] | Dipole moment [D] |
|---|---|---|---|---|
| 1-20 | 2,6-Lutidine | (structure: pyridine with H$_3$C and CH$_3$ at 2,6 positions) | 144 | 1.5 |
| 1-21 | Quinoline | (structure: quinoline) | 237 | 1.8 |
| 1-22 | Formamide | HCONH$_2$ | 210 | 3.4 |
| 1-23 | N,N-Dimethylformamide | HCON(CH$_3$)$_2$ | 153 | 3.4 |
| 1-24 | N,N-Diethylformamide | HCON(C$_2$H$_5$)$_2$ | 177 | 3.4 |
| 1-25 | N,N-Dimethylacetamide | CH$_3$CON(CH$_3$)$_2$ | 166 | 3.2 |
| 1-26 | N,N,N',N'-Tetramethylurea | (CH$_3$)$_2$NCON(CH$_3$)$_2$ | 177 | 2.4 |
| 1-27 | 2-Pyrrolidone | (structure: 2-pyrrolidone N—H) | 245 | 3.6 |
| 1-28 | N-Methyl-2-pyrrolidone | (structure: N-methyl-2-pyrrolidone N—CH$_3$) | 202 | 3.3 |
| 1-29 | Dimethyl sulfoxide | (CH$_3$)$_2$SO | 189 | 4.5 |
| 1-30 | Sulfolane | (structure: sulfolane) | 287 | 4.9 |
| 1-31 | 2-Ethoxyethanol | C$_2$H$_5$OCH$_2$CH$_2$OH | 136 | 0.03 |
| 1-32 | Tetrahydrofurfuryl alcohol | (structure: tetrahydrofuran-CH$_2$OH) | 178 | 1.2 |
| 1-33 | Diethylene glycol | HOC$_2$H$_4$OC$_2$H$_4$OH | 245 | 1.2 |
| 1-34 | Tetraethylene glycol | HO(C$_2$H$_4$O)$_4$H | 327 | 1.7 |
| 1-35 | 1-Ethoxy-2-propanol | CH$_3$—CH(OH)—CH$_2$(OC$_2$H$_5$) | 132 | 2.6 |
| 1-36 | Dipropylene glycol | HOC$_3$H$_6$OC$_3$H$_6$OH | 232 | 3.9 |
| 1-37 | Dipropylene glycol monomethyl ether | H$_3$COC$_3$H$_6$OC$_3$H$_6$OH | 190 | 3.7 |
| 1-38 | Dipropylene glycol monoethyl ether | H$_5$C$_2$OC$_3$H$_6$OC$_3$H$_6$OH | 198 | 3.6 |
| 1-39 | Tripropylene glycol monomethyl ether | H$_3$CO(C$_3$H$_6$O)$_3$H | 243 | 4.7 |
| 1-40 | Diacetone alcohol | CH$_3$—C(O)—CH$_2$—C(CH$_3$)(OH)—CH$_3$ | 168 | 3.3 |
| 1-41 | 3-Chloro-1,2-propanediol | CH$_2$ClCH(OH)CH$_2$OH | 213 | 3.1 |

TABLE 1-continued

Representative examples of solvent A

| No. | Name | Chemical formula | Boiling point [° C.] | Dipole moment [D] |
|---|---|---|---|---|
| 1-42 | N-Butyldiethanolamine | $C_4H_9N(CH_2CH_2OH)_2$ | 274 | 1.1 |
| 1-43 | Triethanolamine | $N(CH_2CH_2OH)_3$ | 360 | 1.7 |
| 1-44 | 2-Methoxyethyl acetate | $CH_3COOCH_2CH_2OCH_3$ | 144 | 3.0 |
| 1-45 | Diethylene glycol monoethyl ether acetate | $CH_3COOCH_2CH_2OCH_2CH_2OC_2H_5$ | 217 | 1.8 |
| 1-46 | Hexamethylphosphoric triamide | $[(CH_3)_2N]_3P{=}O$ | 233 | 2.8 |
| 1-47 | 1,3-Dimethyl-2-imidazolidinone | (1,3-dimethylimidazolidin-2-one) | 225 | 3.5 |
| 1-48 | N,N,N',N'-Tetramethyl-ethylenediamine | $(CH_3)_2NCH_2CH_2N(CH_3)_2$ | 121 | 0.1 |
| 1-49 | 2-methyl-2,4-pentanediol | $(CH_3)_2C(OH){-}CH_2{-}CH(OH){-}CH_3$ | 197 | 2.8 |
| 1-50 | 2-Butoxyethanol | $H_9C_4OCH_2CH_2OH$ | 170 | 0.4 |
| 1-51 | Diethylene glycol monomethyl ether | $H_3CO(C_2H_4O)_2H$ | 194 | 1.5 |
| 1-52 | Diethylene glycol monoethyl ether | $H_5C_2O(C_2H_4O)_2H$ | 202 | 1.6 |
| 1-53 | Triethylene glycol | $HOC_2H_4OC_2H_4OC_2H_4OH$ | 288 | 0.03 |

TABLE 2

Representative examples of solvent B

| No. | Name | Chemical formula | Boiling point [° C.] | Dipole moment [D] |
|---|---|---|---|---|
| 2-1 | Toluene | C₆H₅–CH₃ | 110 | 0.3 |
| 2-2 | 1,2-Dimethylbenzene | o-C₆H₄(CH₃)₂ | 144 | 0.5 |
| 2-3 | 1,3-Dimethylbenzene | m-C₆H₄(CH₃)₂ | 139 | 0.2 |

TABLE 2-continued

Representative examples of solvent B

| No. | Name | Chemical formula | Boiling point [° C.] | Dipole moment [D] |
|---|---|---|---|---|
| 2-4 | 1,4-Dimethylbenzene | $H_3C$-⟨⟩-$CH_3$ | 138 | 0.1 |
| 2-5 | 1,3,5-Trimethylbenzene | $H_3C$-⟨⟩($CH_3$)($CH_3$) | 165 | 0.05 |
| 2-6 | Monochlorobenzene | ⟨⟩-Cl | 132 | 0.7 |
| 2-7 | Pentane | $C_5H_{12}$ | 36 | 0 |
| 2-8 | n-Hexane | $C_6H_{14}$ | 69 | 0 |
| 2-9 | Cyclohexane | ⟨⟩ | 81 | 0 |
| 2-10 | n-Heptane | $C_7H_{16}$ | 98 | 0 |
| 2-11 | Dichloromethane | $CH_2Cl_2$ | 39 | 0.9 |
| 2-12 | Chloroform | $CHCl_3$ | 62 | 1.0 |

Among the solvents listed in Tables 1 and 2, from the perspective of affinity with water, preferable examples of solvent A include dimethyl sulfoxide, sulfolane, ethylene carbonate, propylene carbonate, dimethyl formamide, diethyl formamide, dimethyl acetamide, 2-butoxyethanol, 2-pyrrolidone, N-methyl-2-pyrrolidone, diethylene glycol monomethyl ether, diethylene glycol monoethyl ether, triethylene glycol and dipropylene glycol. Preferable examples of solvent B include aromatic organic solvents. Especially preferable examples include toluene, 1,2-dimethylbenzene, 1,3-dimethylbenzene, 1,4-dimethylbenzene, 1,3,5-trimethylbenzene and monochlorobenzene. These solvents may be used alone, or in combination of two or more thereof. Further, in terms of production stability, solvent A and solvent B preferably have affinity with each other and form a uniform solution; specifically, they are compatible with each other.

The polymer compound which is soluble in solvent B according to the present invention can be variously selected without restriction depending on the functional properties required in the solid body to be obtained as a product, as long as it is soluble in solvent B. For example, if considering applying to an electronic device, preferable examples would include acrylic resin, methacrylic resin, styrene resin, styrene-acrylonitrile copolymer resin, polyester resin, polycarbonate resin, polyarylate resin, polysulfone resin, polyphenyleneoxide resin, epoxy resin, polyurethane resin, alkyd resin, unsaturated resins, conductive resins, aromatic polyester resins and diallylphthalate resin. Among these examples, in terms of good solubility in solvent B, a polycarbonate resin or aromatic polyester resin is especially preferable. These polymer compounds may be used alone, or in combination of two or more thereof.

The production method according to the present invention forms a depressed portion from condensation on a surface of a solution during the process of evaporating the solvent in a solution which comprises the above-described solvent A, solvent B, and polymer compound which is soluble in solvent B. Here, "condensation" as used in the present invention refers to water vapor in the air condensing on the solution surface and/or in the solution. Accordingly, the solid body having a depressed portion includes the solid body having a depressed portion only on the surface, the solid body in which pores on the surface is penetrated, and the solid body in which many pores are also present in interior of the solid body.

Commonly-known methods to promote the condensation of water on the surface of a hydrophobic organic solvent solution of a polymer compound include: promoting condensation by cooling the hydrophobic organic solvent solution of a polymer compound; using a highly volatile organic solvent such as dichloromethane to promote condensation by utilizing the cooling effect from evaporation; promoting condensation by controlling the surrounding environment at a high humidity; promoting condensation by blowing a high-humidity gas; or promoting condensation by controlling the solute in which a special amphiphilic polymer is utilized.

The production method according to the present invention is characterized in that condensation is promoted by using a hydrophilic solvent A for the solvent of the above-described solution, and controlling the solvent system of the above-described solution. The present invention has the advantages that: the shape and the depth of the depressed portion formed on the surface of the solid body by condensation can be controlled in accordance with the kind and amount of solvent A, or by the combination thereof; costs can be reduced by utilizing a general-purpose solvent; production stability is excellent as a result of the production method being simple; versatility is excellent because no special production equipment is necessary; and the range of applications is broad.

However, to achieve a sufficient condensation promotion effect from the solvent A, the solvent A boiling point must be equal to or higher than the solvent B boiling point. If this is not the case, the solvent A will evaporate before the depressed portion can be stably formed by condensation, or condensation water will boil off along with solvent A, whereby the depressed portion might not be able to be formed.

Further, in the production method according to the present invention, the total mass of the hydrophobic solvent B has to be 50% or more of the total mass of the solvents contained in the above-described solution in order to form the depressed portion from condensation on the surface of the solid body. If this range is not satisfied, it may be difficult to form the depressed portion from condensation.

Further, in the present invention, in the case of using two or more kinds of solvent A together, the boiling point of the solvent with the highest composition ratio among such solvents becomes the "solvent A boiling point". Similarly, in the case of using two or more kinds of solvent B together, the boiling point of the solvent with the highest composition ratio among such solvents becomes the "solvent B boiling point".

In the production method according to the present invention, the above-described solution can be treated in a variety of different ways depending on the functional properties required in the solid body to be obtained as a product. For example, for the solid body, if forming a surface layer having a depressed portion, the surface layer can be coated onto the substrate by a well-known method such as dip coating or spin coating, to form the surface layer having a depressed portion. Further, a thin membrane or film can be fabricated by peeling off a film formed on the substrate by these same methods from the substrate. In addition, a thin membrane or film can be fabricated by flowing the above-described solution over a water surface.

Further, in the production method according to the present invention, various compounds may be added to the solution for the purpose of conferring functionality to the solid body to be obtained as a product, such as a plasticizer, crosslinking agent, metal fine particles, organic fine particles, electrically conductive compound, antimicrobial agent or the like. Moreover, the kind or amount of solvent A and solvent B may be varied or two or more kinds of solvent can be used together in order to control of the solution viscosity, dew point or overall coated surface smoothness, modify the dissolving power of the solvent system of the solution, or control the size and depth of the pores in the product. In addition, various solvents other than solvent A and solvent B may be used. It is also possible to combine the step of modifying the temperature of the solution, the temperature of the substrate over which the solution flows, and the humidity of the surrounding environment, and the step of blowing a high-humidity gas onto the surface of the solution.

EXAMPLES

The present invention will now be described in more detail with reference to specific examples. However, the present invention is not intended to be limited to these examples. In the examples, the term "parts" means "parts by mass" and "MW" means "weight average molecular weight (MW)".

Example 1

Figure 8:
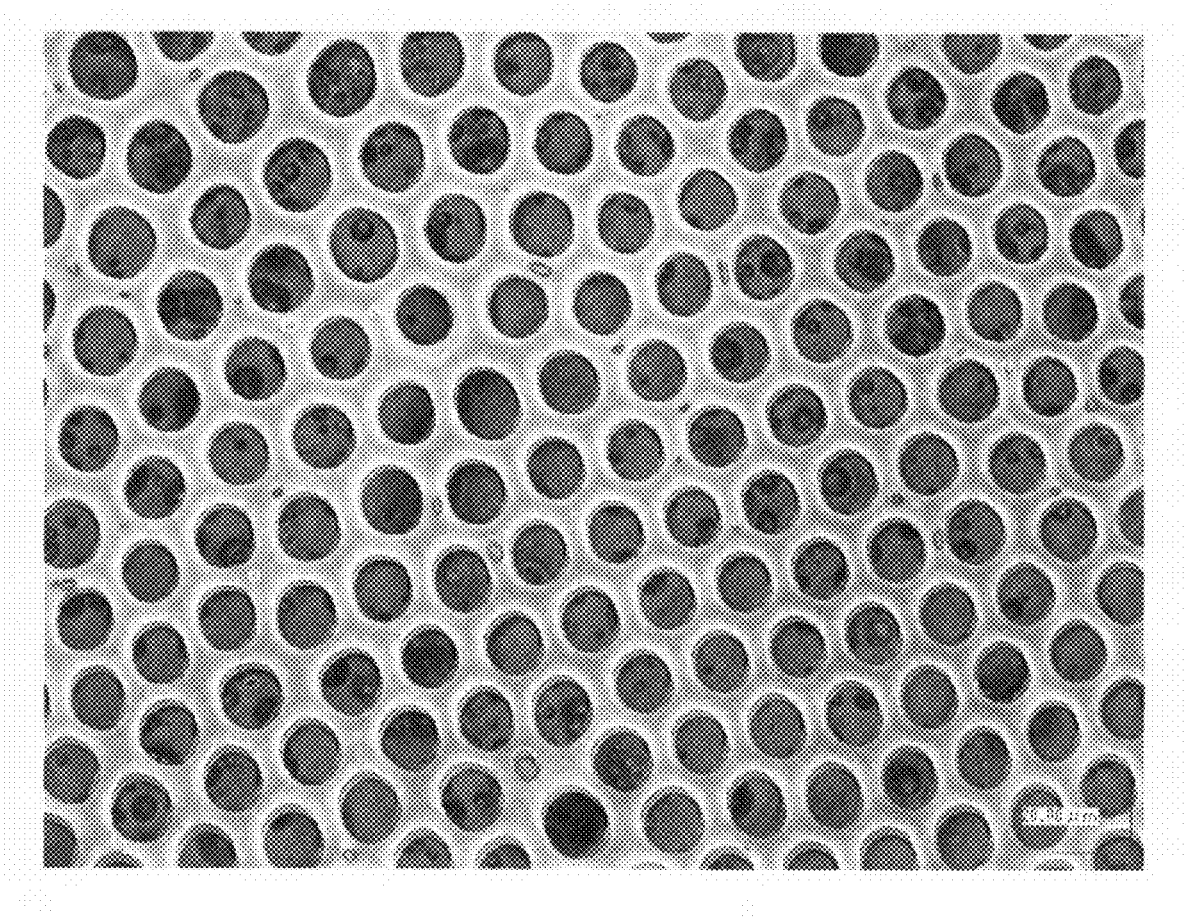
FIG. 8 is an image observed by laser microscope of the resin film surface formed in Example 1.

A solution was prepared by mixing together and dissolving 6 parts of dimethyl sulfoxide as solvent A, 54 parts of monochlorobenzene as solvent B and 12 parts of polycarbonate resin ("Iupilon Z200", manufactured by Mitsubishi Gas Chemical Company, Inc.) as the polymer compound. Next, this solution was coated onto a glass plate under normal temperature and humidity conditions (23° C., 50% RH). Then, while evaporating the solvent by leaving the glass plate for 10 minutes under normal temperature and humidity conditions, a depressed portion was formed on the coated film surface. The glass plate was then dried by heating for 1 hour at 150° C. to form a polycarbonate resin film on the glass plate. Observation of this resin film with a laser microscope ("VK-9500", manufactured by Keyence Corporation) showed that shapes were formed on the surface which had a plurality of pores regularly formed thereon. The pore diameter was about 14 µm, and the depth was about 10 µm. The observed results of this surface are shown in FIG. 8. The contact angle with water on the thus-formed resin film was measured at 110°, which is a high contact angle showing that the resin film was water repellent. The friction coefficient was measured to be 0.8. These results are shown in Table 3-1. The contact angle with respect to water and the friction coefficient were measured in accordance with the following methods.

(Contact Angle Measurement)

Contact angle was measured by a droplet method using pure water under normal temperature and humidity conditions (23±3° C., 50±10% RH) with a contact angle meter (CA-VP series) and accompanying application software ("FAMAS version 21.0"), both manufactured by Kyowa Interface Science Co., Ltd. Measurement was conducted 0.3 seconds after a pure water drop had adhered to the surface by setting the "Auto Dispenser AD-21", also manufactured by Kyowa Interface Science Co., Ltd., to Level 50 and modifying the amount of pure water.

(Friction Coefficient Measurement)

Using a "Tribostation Type 32" manufactured by Shinto Scientific Co., Ltd., a urethane rubber blade (rubber hardness of 77 degrees) manufactured by Bando Chemical Industries Limited was mounted onto a blade holder. Then, under normal temperature and humidity conditions (23±3° C., 50±10% RH), friction coefficient was measured by adjusting to conditions of a 20 g load, 22.5° contact angle and 10 mm abutting width.

Comparative Example 1

A solution was prepared, without using any solvent A, by mixing together and dissolving 60 parts of monochlorobenzene and 12 parts of polycarbonate resin ("Iupilon Z200", manufactured by Mitsubishi Gas Chemical Company, Inc.). Next, this solution was coated onto a glass plate under normal temperature and humidity conditions (23° C., 50% RH). Then, the solvent was made to evaporate by leaving the glass plate for 10 minutes under normal temperature and humidity conditions. The glass plate was then dried by heating for 1 hour at 150° C. to form a polycarbonate resin film on the glass plate. Observation of this resin film in the same manner as in Example 1 with a laser microscope ("VK-9500", manufactured by Keyence Corporation) showed that depressed portions were not formed. The contact angle with water of the thus-formed resin film was measured at 75°. The friction coefficient was measured to be 1.2. These results are shown in Table 3-3.

Example 2

A solution was prepared by mixing together and dissolving 1.8 parts of dimethyl sulfoxide as solvent A, 58.2 parts of monochlorobenzene as solvent B and 12 parts of polycarbonate resin ("Iupilon Z200", manufactured by Mitsubishi Gas Chemical Company, Inc.) as the polymer compound. In the same manner as in Example 1, the solution was coated onto a glass plate and left to stand, then dried by heating to form a polycarbonate resin film. In the same manner as in Example 1, the surface state was observed, and the contact angle with water and the friction coefficient were measured. The results of the contact angle and friction coefficient measurements are shown in Table 3-1. Further, a plurality of pores were regularly formed on the surface of the resin film. The pore diameter was about 6 μm, and the depth was about 4 μm.

Example 3

Figure 9:
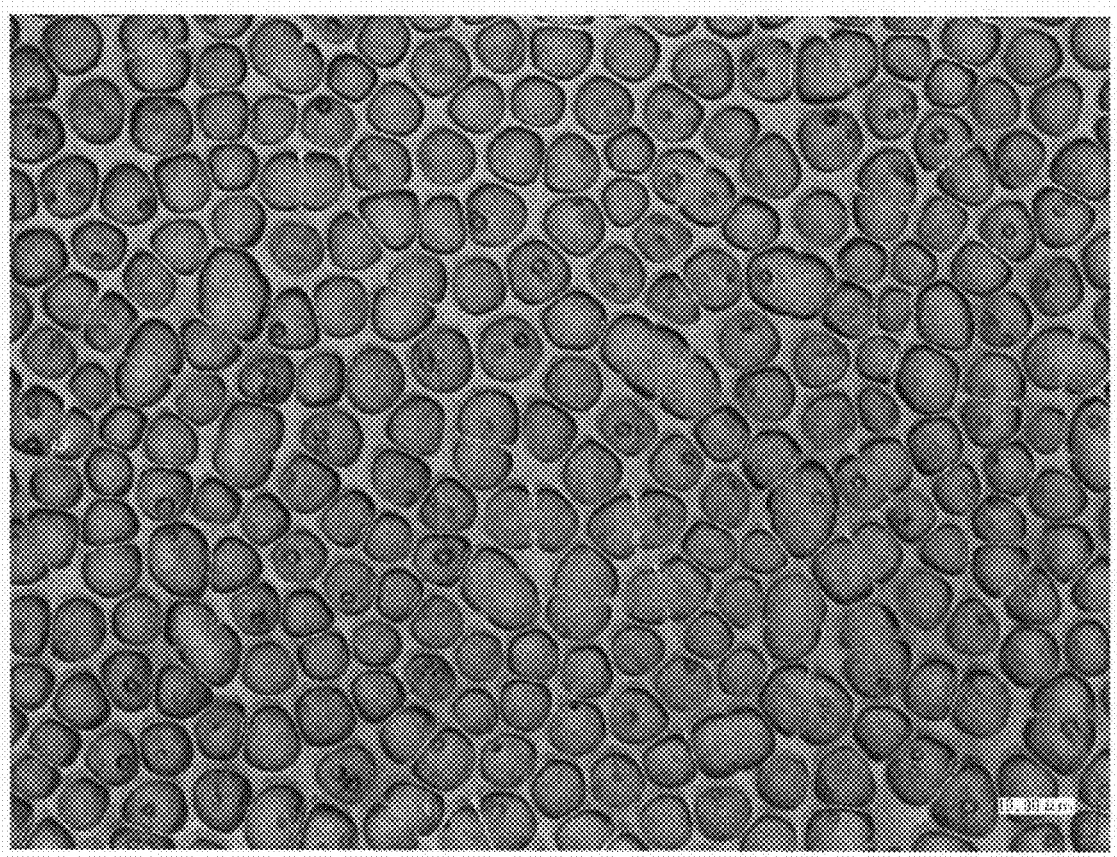
FIG. 9 is an image observed by laser microscope of the resin film surface formed in Example 3.

A solution was prepared by mixing together and dissolving 9 parts of N,N-dimethylformamide as solvent A, 51 parts of monochlorobenzene as solvent B and 12 parts of polycarbonate resin ("Iupilon Z200", manufactured by Mitsubishi Gas Chemical Company, Inc.) as the polymer compound. Next, this solution was coated onto a glass plate under normal temperature and humidity conditions (23° C., 50% RH). Then, while evaporating the solvent by standing the glass plate for 24 hours under normal temperature and humidity conditions, a depressed portion was formed on the coated film surface, and a polycarbonate resin film was formed on the glass plate. In the same manner as in Example 1, the surface state of this resin was observed, and the contact angle with water and the friction coefficient were measured. The observed results of the surface are shown in FIG. 9, and the results of the contact angle and friction coefficient measurements are shown in Table 3-1.

Example 4

Figure 10:
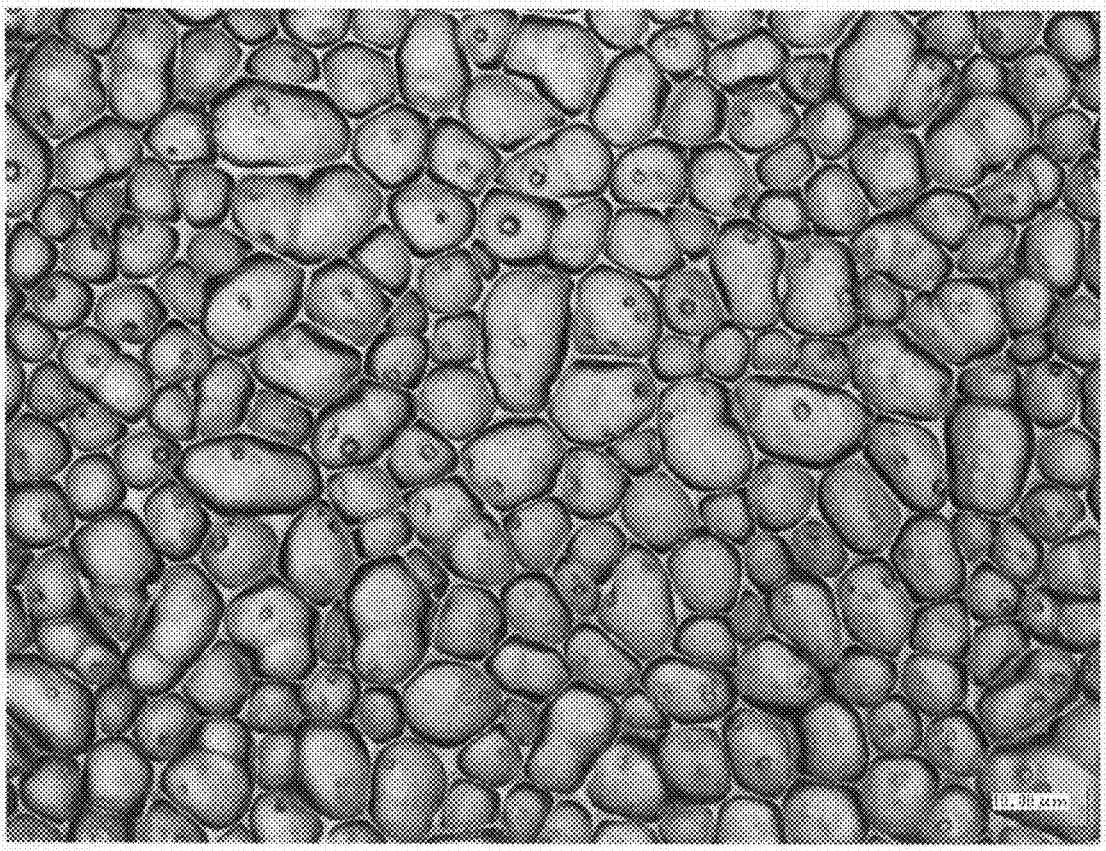
FIG. 10 is an image observed by laser microscope of the resin film surface formed in Example 4.

A solution was prepared by mixing together and dissolving 9 parts of N,N-dimethylacetamide as solvent A, 51 parts of monochlorobenzene as solvent B and 12 parts of polycarbonate resin ("Iupilon Z200", manufactured by Mitsubishi Gas Chemical Company, Inc.) as the polymer compound. Next, this solution was coated onto a glass plate under normal temperature and humidity conditions (23° C., 50% RH). Then, while evaporating the solvent by standing the glass plate for 24 hours under normal temperature and humidity conditions, a depressed portion was formed on the coated film surface, and a polycarbonate resin film was formed on the glass plate. In the same manner as in Example 1, the surface state of this resin was observed, and the contact angle with water and the friction coefficient were measured. The observed results of the surface are shown in FIG. 10, and the results of the contact angle and friction coefficient measurements are shown in Table 3-1.

Example 5

A solution was prepared by mixing together and dissolving 6 parts of ethylene carbonate as solvent A, 48 parts of monochlorobenzene as solvent B, 6 parts of dimethoxymethane as another solvent and 12 parts of polycarbonate resin ("Iupilon Z200", manufactured by Mitsubishi Gas Chemical Company, Inc.) as the polymer compound. In the same manner as in Example 1, the solution was coated onto a glass plate and left to stand, then dried by heating to form a polycarbonate resin film. In the same manner as in Example 1, the surface state was observed, and the contact angle with water and the friction coefficient were measured. A plurality of pores were formed on the surface of the resin film. The results of the contact angle and friction coefficient measurements are shown in Table 3-1.

Comparative Example 2

A solution was prepared, without using any solvent A, by mixing together and dissolving 54 parts of monochlorobenzene, 6 parts of dimethoxymethane and 12 parts of polycarbonate resin ("Iupilon Z200", manufactured by Mitsubishi Gas Chemical Company, Inc.). Next, this solution was coated onto a glass plate under normal temperature and humidity conditions (23° C., 50% RH). Then, the solvent was made to evaporate by leaving the glass plate for 10 minutes under normal temperature and humidity conditions. The glass plate was then dried by heating for 1 hour at 150° C. to form a polycarbonate resin film on the glass plate. Observation of this resin film in the same manner as in Example 1 with a laser microscope ("VK-9500", manufactured by Keyence Corporation) showed that depressed portions were not formed. The contact angle with water of the thus-formed resin film was measured at 75°. The friction coefficient was measured to be 1.2. These results are shown in Table 3-3.

Example 6

A solution was prepared by mixing together and dissolving 9 parts of tetrahydrofurfuryl alcohol as solvent A, 51 parts of monochlorobenzene as solvent B, and 12 parts of polycarbonate resin ("Iupilon Z200", manufactured by Mitsubishi Gas Chemical Company, Inc.) as the polymer compound. In the same manner as in Example 1, the solution was coated onto a glass plate and left to stand, then dried by heating to form a polycarbonate resin film. In the same manner as in Example 1, the surface state was observed, and the contact angle with water and the friction coefficient were measured. A plurality of pores were formed on the surface of the resin film. The results of the contact angle and friction coefficient measurements are shown in Table 3-1.

Example 7

A solution was prepared by mixing together and dissolving 6 parts of 2-pyrrolidone as solvent A, 54 parts of monochlorobenzene as solvent B and 12 parts of polycarbonate resin ("Iupilon Z200", manufactured by Mitsubishi Gas Chemical Company, Inc.) as the polymer compound. In the same manner as in Example 1, the solution was coated onto a glass plate and left to stand, then dried by heating to form a polycarbonate resin film. In the same manner as in Example 1, the surface state was observed, and the contact angle with water and the friction coefficient were measured. A plurality of pores were formed on the surface of the resin film. The results of the contact angle and friction coefficient measurements are shown in Table 3-1.

Example 8

A solution was prepared by mixing together and dissolving 6 parts of N-methyl-2-pyrrolidone as solvent A, 54 parts of monochlorobenzene as solvent B and 12 parts of polycarbonate resin ("Iupilon Z200", manufactured by Mitsubishi Gas Chemical Company, Inc.) as the polymer compound. In the same manner as in Example 1, the solution was coated onto a glass plate and left to stand, then dried by heating to form a polycarbonate resin film. In the same manner as in Example 1, the surface state was observed, and the contact angle with water and the friction coefficient were measured. A plurality of pores were formed on the surface of the resin film. The results of the contact angle and friction coefficient measurements are shown in Table 3-1.

Example 9

A solution was prepared by mixing together and dissolving 3 parts of 2-methyl-2,4-pentanediol as solvent A, 57 parts of monochlorobenzene as solvent B and 12 parts of polycarbonate resin ("Iupilon Z200", manufactured by Mitsubishi Gas Chemical Company, Inc.) as the polymer compound. In the same manner as in Example 1, the solution was coated onto a glass plate and left to stand, then dried by heating to form a polycarbonate resin film. In the same manner as in Example 1, the surface state was observed, and the contact angle with water and the friction coefficient were measured. A plurality of pores were formed on the surface of the resin film. The results of the contact angle and friction coefficient measurements are shown in Table 3-1.

Example 10

A solution was prepared by mixing together and dissolving 6 parts of triethylene glycol as solvent A, 54 parts of monochlorobenzene as solvent B and 12 parts of polycarbonate resin ("Iupilon Z200", manufactured by Mitsubishi Gas Chemical Company, Inc.) as the polymer compound. In the same manner as in Example 1, the solution was coated onto a glass plate and left to stand, then dried by heating to form a polycarbonate resin film. In the same manner as in Example 1, the surface state was observed, and the contact angle with water and the friction coefficient were measured. A plurality of pores were formed on the surface of the resin film. The results of the contact angle and friction coefficient measurements are shown in Table 3-1.

Example 11

A solution was prepared by mixing together and dissolving 4 parts of dimethyl sulfoxide as solvent A, 22 parts of toluene as solvent B, 14 parts of dimethoxymethane as another solvent and 4 parts of polyarylate resin having the following structure as the polymer compound. Next, this solution was dip-coated onto a glass plate under normal temperature and humidity conditions (23° C., 50% RH). Then, while evaporating the solvent by leaving the glass plate for 10 minutes under normal temperature and humidity conditions, an depressed portion was formed on the coated film surface. The glass plate was then dried by heating for 1 hour at 150° C. to form a polyarylate resin film on the glass plate. The surface state of this resin film was observed in the same manner as in Example 1, and the contact angle with water and the friction coefficient were measured. A plurality of pores were regularly formed on the surface of the resin film. The results of the contact angle and friction coefficient measurements are shown in Table 3-2.

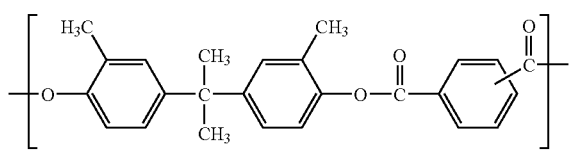

Note: The aromatic dicarboxylic acid moiety in the above structural formula represents a fifty-fifty mixture of terephthalic acid and isophthalic acid.

Comparative Example 3

A solution was prepared, without using any solvent A, by mixing together and dissolving 26 parts of toluene, 14 parts of dimethoxymethane and 4 parts of polyarylate resin having the following structure. Next, this solution was dip-coated onto a glass plate under normal temperature and humidity conditions (23° C., 50% RH). Then, the solvent was made to evaporate by leaving the glass plate for 10 minutes under normal temperature and humidity conditions. The glass plate was then dried by heating for 1 hour at 150° C. to form a polyarylate resin film on the glass plate. Observation of this resin film in the same manner as in Example 1 with a laser microscope ("VK-9500", manufactured by Keyence Corporation) showed that depressed portions were not formed. The contact angle with water of the thus-formed resin film was measured at 77°. The friction coefficient was measured to be 1.5. These results are shown in Table 3-3.

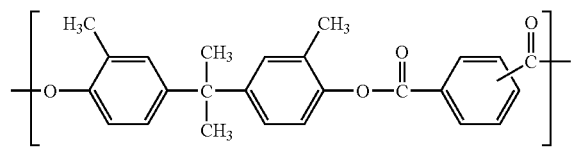

Note: The aromatic dicarboxylic acid moiety in the above structural formula represents a fifty-fifty mixture of terephthalic acid and isophthalic acid.

Example 12

A solution was prepared by mixing together and dissolving 6 parts of 2-butoxyethanol as solvent A, 54 parts of monochlorobenzene as solvent B and 6 parts of polyarylate resin having the following structure as the polymer compound. In the same manner as in Example 11, the solution was dip-coated onto a glass plate and left to stand, then dried by heating to form a polyarylate resin film. In the same manner as in Example 1, the surface state was observed, and the contact angle with water and the friction coefficient were measured. A plurality of pores were formed on the surface of the resin film. The results of the contact angle and friction coefficient measurements are shown in Table 3-2.

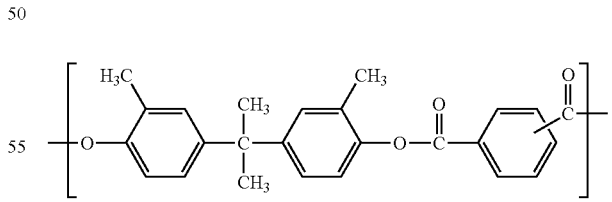

Note: The aromatic dicarboxylic acid moiety in the above structural formula represents a fifty-fifty mixture of terephthalic acid and isophthalic acid.

Comparative Example 4

A solution was prepared, without using any solvent A, by mixing together and dissolving 60 parts of monochlorobenzene and 6 parts of polyarylate resin having the following structure. Next, this solution was dip-coated onto a glass plate under normal temperature and humidity conditions (23° C., 50% RH). Then, the solvent was made to evaporate by leaving the glass plate for 10 minutes under normal temperature and humidity conditions. The glass plate was then dried by heating for 1 hour at 150° C. to form a polyarylate resin film on the glass plate. Observation of this resin film in the same manner as in Example 1 with a laser microscope ("VK-9500", manufactured by Keyence Corporation) showed that depressed portions were not formed. The contact angle with water of the thus-formed resin film was measured at 76°. The friction coefficient was measured to be 1.5. These results are shown in Table 3-3.

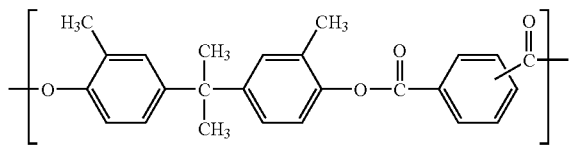

Note: The aromatic dicarboxylic acid moiety in the above structural formula represents a fifty-fifty mixture of terephthalic acid and isophthalic acid.

Example 13

A solution was prepared by mixing together and dissolving 6 parts of diethylene glycol monomethyl ether as solvent A, 54 parts of monochlorobenzene as solvent B and 6 parts of polyarylate resin having the following structure as the polymer compound. In the same manner as in Example 11, the solution was dip-coated onto a glass plate and left to stand, then dried by heating to form a polyarylate resin film. In the same manner as in Example 1, the surface state was observed, and the contact angle with water and the friction coefficient were measured. A plurality of pores were formed on the surface of the resin film. The results of the contact angle and friction coefficient measurements are shown in Table 3-2.

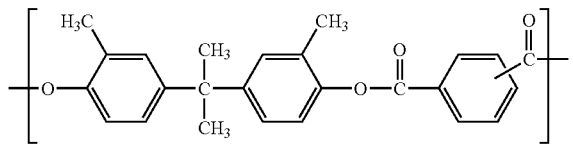

Note: The aromatic dicarboxylic acid moiety in the above structural formula represents a fifty-fifty mixture of terephthalic acid and isophthalic acid.

Example 14

A solution was prepared by mixing together and dissolving 6 parts of diethylene glycol monoethyl ether as solvent A, 54 parts of monochlorobenzene as solvent B and 6 parts of polyarylate resin having the following structure as the polymer compound. In the same manner as in Example 11, the solution was dip-coated onto a glass plate and left to stand, then dried by heating to form a polyarylate resin film. In the same manner as in Example 1, the surface state was observed, and the contact angle with water and the friction coefficient were measured. A plurality of pores were formed on the surface of the resin film. The results of the contact angle and friction coefficient measurements are shown in Table 3-2.

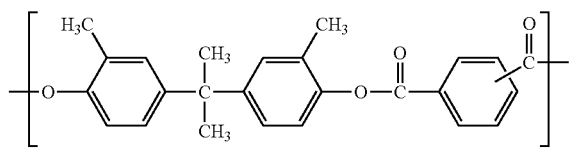

Note: The aromatic dicarboxylic acid moiety in the above structural formula represents a fifty-fifty mixture of terephthalic acid and isophthalic acid.

Example 15

A solution was prepared by mixing together and dissolving 6 parts of dipropylene glycol as solvent A, 54 parts of monochlorobenzene as solvent B and 6 parts of polyarylate resin having the following structure as the polymer compound. In the same manner as in Example 11, the solution was dip-coated onto a glass plate and left to stand, then dried by heating to form a polyarylate resin film. In the same manner as in Example 1, the surface state was observed, and the contact angle with water and the friction coefficient were measured. A plurality of pores were formed on the surface of the resin film. The results of the contact angle and friction coefficient measurements are shown in Table 3-2.

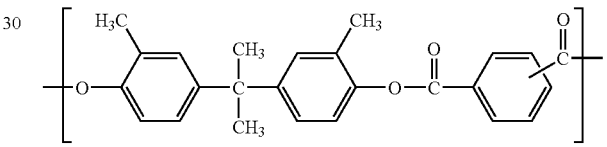

Note: The aromatic dicarboxylic acid moiety in the above structural formula represents a fifty-fifty mixture of terephthalic acid and isophthalic acid.

Example 16

A solution was prepared by mixing together and dissolving 6 parts of polyethylene glycol 200 (average molecular weight of 190 to 200) as solvent A, 54 parts of monochlorobenzene as solvent B and 6 parts of polyarylate resin having the following structure as the polymer compound. In the same manner as in Example 11, the solution was dip-coated onto a glass plate and left to stand, then dried by heating to form a polyarylate resin film. In the same manner as in Example 1, the surface state was observed, and the contact angle with water and the friction coefficient were measured. A plurality of pores were formed on the surface of the resin film. The results of the contact angle and friction coefficient measurements are shown in Table 3-2.

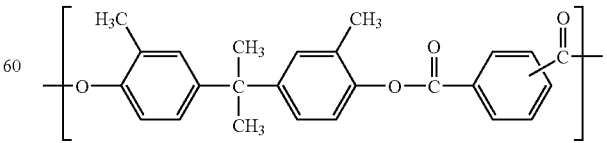

Note: The aromatic dicarboxylic acid moiety in the above structural formula represents a fifty-fifty mixture of terephthalic acid and isophthalic acid.

Example 17

A solution was prepared by mixing together and dissolving 8 parts of diethylene glycol diethyl ether as solvent A, 32 parts of cyclohexane as solvent B and 8 parts of cyclic olefin copolymer ("Topas 5013", manufactured by Ticona Limited) having the following structure as the polymer compound. Next, this solution was spin-coated onto a glass plate under normal temperature and humidity conditions (23° C., 50% RH). Then, while evaporating the solvent by leaving the glass plate for 10 minutes under normal temperature and humidity conditions, a depressed portion was formed on the coated film surface. The glass plate was then dried by heating for 1 hour at 150° C. to form a resin film on the glass plate. The surface state of this resin film was observed in the same manner as in Example 1, and the contact angle with water and the friction coefficient were measured. A plurality of pores were regularly formed on the surface of the resin film. The results of the contact angle and friction coefficient measurements are shown in Table 3-2.

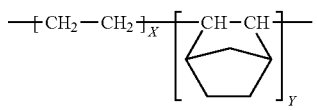

Comparative Example 5

A solution was prepared, without using any solvent A, by mixing together and dissolving 40 parts of cyclohexane and 8 parts of cyclic olefin copolymer ("Topas 5013", manufactured by Ticona Limited) having the following structure as the polymer compound. Next, this solution was spin-coated onto a glass plate under normal temperature and humidity conditions (23° C., 50% RH). Then, the solvent was made to evaporate by leaving the glass plate for 10 minutes under normal temperature and humidity conditions. The glass plate was then dried by heating for 1 hour at 150° C. to form a resin film on the glass plate. Observation of this resin film in the same manner as in Example 1 with a laser microscope ("VK-9500", manufactured by Keyence Corporation) showed that depressed portions were not formed. The contact angle with water of the thus-formed resin film was measured at 80°. The friction coefficient was measured to be 1.0. These results are shown in Table 3-3.

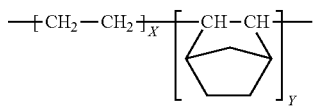

Example 18

A solution was prepared by mixing together and dissolving 4 parts of tetrahydrofurfuryl alcohol as solvent A, 36 parts of cyclohexane as solvent B and 8 parts of cyclic olefin copolymer ("Topas 5013", manufactured by Ticona) having the following structure as the polymer compound. In the same manner as in Example 17, the solution was spin-coated onto a glass plate and left to stand, then dried by heating to form a resin film. In the same manner as in Example 1, the surface state was observed, and the contact angle with water and the friction coefficient were measured. A plurality of pores were formed on the surface of the resin film. The results of the contact angle and friction coefficient measurements are shown in Table 3-2.

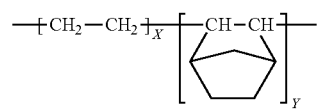

Example 19

A solution was prepared by mixing together and dissolving 4 parts of N,N,N',N'-tetramethylurea as solvent A, 36 parts of cyclohexane as solvent B and 8 parts of cyclic olefin copolymer ("Topas 5013", manufactured by Ticona Limited) having the following structure as the polymer compound. In the same manner as in Example 17, the solution was spin-coated onto a glass plate and left to stand, then dried by heating to form a resin film. In the same manner as in Example 1, the surface state was observed, and the contact angle with water and the friction coefficient were measured. A plurality of pores were formed on the surface of the resin film. The results of the contact angle and friction coefficient measurements are shown in Table 3-2.

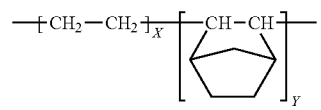

Example 20

A solution was prepared by mixing together and dissolving 4 parts of N,N,N',N'-tetramethylethylenediamine as solvent A, 36 parts of cyclohexane as solvent B and 8 parts of cyclic olefin copolymer ("Topas 5013", manufactured by Ticona Limited) having the following structure as the polymer compound. In the same manner as in Example 17, the solution was spin-coated onto a glass plate and left to stand, then dried by heating to form a resin film. In the same manner as in Example 1, the surface state was observed, and the contact angle with water and the friction coefficient were measured. A plurality of pores were formed on the surface of the resin film. The results of the contact angle and friction coefficient measurements are shown in Table 3-2.

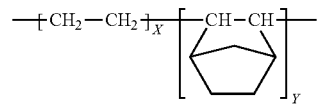

TABLE 3-1

| No. | Solvent A Dipole moment Boiling point | Solvent A Parts by mass | Solvent B Dipole moment Boiling point | Solvent B Parts by mass | Other solvent Dipole moment Boiling point | Other solvent Parts by mass | Polymer compound Parts by mass | Contact angle | Friction co-efficient |
|---|---|---|---|---|---|---|---|---|---|
| Ex. 1 | Dimethyl sulfoxide 4.5 [D] 189 [° C.] | 6 | Monochlorobenzene 0.953 [D] 131.7 [° C.] | 54 | — | — | Polycarbonate resin 12 | 110 | 0.8 |
| Ex. 2 | Dimethyl sulfoxide 4.5 [D] 189 [° C.] | 1.8 | Monochlorobenzene 0.953 [D] 131.7 [° C.] | 58.2 | — | — | Polycarbonate resin 12 | 112 | 0.8 |
| Ex. 3 | N,N-dimethylformamide 3.4 [D] 153 [° C.] | 9 | Monochlorobenzene 0.953 [D] 131.7 [° C.] | 51 | — | — | Polycarbonate resin 12 | 123 | 0.7 |
| Ex. 4 | N,N-dimethylacetamide 3.2 [D] 166 [° C.] | 9 | Monochlorobenzene 0.953 [D] 131.7 [° C.] | 51 | — | — | Polycarbonate resin 12 | 128 | 0.7 |
| Ex. 5 | Ethylene carbonate 4.6 [D] 238 [° C.] | 6 | Monochlorobenzene 0.953 [D] 131.7 [° C.] | 48 | Dimethoxymethane 2.4 [D] 42.3 [° C.] | 6 | Polycarbonate resin 12 | 105 | 0.9 |
| Ex. 6 | Tetrahydrofurfuryl alcohol 1.2 [D] 178 [° C.] | 9 | Monochlorobenzene 0.953 [D] 131.7 [° C.] | 51 | — | — | Polycarbonate resin 12 | 92 | 1.0 |
| Ex. 7 | 2-pyrrolidone 3.6 [D] 245 [° C.] | 6 | Monochlorobenzene 0.953 [D] 131.7 [° C.] | 54 | — | — | Polycarbonate resin 12 | 120 | 0.7 |
| Ex. 8 | N-methyl-2-pyrrolidone 3.3 [D] 202 [° C.] | 6 | Monochlorobenzene 0.953 [D] 131.7 [° C.] | 54 | — | — | Polycarbonate resin 12 | 100 | 0.9 |
| Ex. 9 | 2-methyl-2,4-pentanediol 2.8 [D] 197 [° C.] | 3 | Monochlorobenzene 0.953 [D] 131.7 [° C.] | 57 | — | — | Polycarbonate resin 12 | 96 | 0.9 |
| Ex. 10 | Triethylene glycol 0.03 [D] 288 [° C.] | 6 | Monochlorobenzene 0.953 [D] 131.7 [° C.] | 54 | — | — | Polycarbonate resin 12 | 110 | 0.8 |

TABLE 3-2

| No. | Solvent A Dipole moment Boiling point | Solvent A Parts by mass | Solvent B Dipole moment Boiling point | Solvent B Parts by mass | Other solvent Dipole moment Boiling point | Other solvent Parts by mass | Polymer compound Parts by mass | Contact angle | Friction co-efficient |
|---|---|---|---|---|---|---|---|---|---|
| Ex. 11 | Dimethyl sulfoxide 4.5 [D] 189 [° C.] | 4 | Toluene 0.261 [D] 110.6 [° C.] | 22 | Dimethoxymethane 2.4 [D] 42.3 [° C.] | 14 | Polyarylate resin 4 | 104 | 1.2 |
| Ex. 12 | 2-butoxyethanol 0.4 [D] 170 [° C.] | 6 | Monochlorobenzene 0.953 [D] 131.7 [° C.] | 54 | — | — | Polyarylate resin 6 | 110 | 1.0 |
| Ex. 13 | Diethylene glycol monomethyl ether 1.5 [D] 194 [° C.] | 6 | Monochlorobenzene 0.953 [D] 131.7 [° C.] | 54 | — | — | Polyarylate resin 6 | 110 | 1.0 |
| Ex. 14 | Diethylene glycol monoethyl ether 1.6 [D] 202 [° C.] | 6 | Monochlorobenzene 0.953 [D] 131.7 [° C.] | 54 | — | — | Polyarylate resin 6 | 108 | 1.0 |
| Ex. 15 | Dipropylene glycol 3.9 [D] 232 [° C.] | 6 | Monochlorobenzene 0.953 [D] 131.7 [° C.] | 54 | — | — | Polyarylate resin 6 | 103 | 1.2 |

TABLE 3-2-continued

| No. | Solvent A Dipole moment Boiling point | Solvent A Parts by mass | Solvent B Dipole moment Boiling point | Solvent B Parts by mass | Other solvent Dipole moment Boiling point | Other solvent Parts by mass | Polymer compound Parts by mass | Contact angle | Friction co-efficient |
|---|---|---|---|---|---|---|---|---|---|
| Ex. 16 | Polyethylene glycol 200 — 250 [° C.] | 6 | Monochlorobenzene 0.953 [D] 131.7 [° C.] | 54 | — | — | Polyarylate resin 6 | 112 | 0.8 |
| Ex. 17 | Diethylene glycol diethyl ether 1.1 [D] 188 [° C.] | 8 | Cyclohexane 0 [D] 81 [° C.] | 32 | — | — | Cyclic olefin copolymer 8 | 115 | 0.8 |
| Ex. 18 | Tetrahydrofurfuryl alcohol 1.2 [D] 178 [° C.] | 4 | Cyclohexane 0 [D] 81 [° C.] | 36 | — | — | Cyclic olefin copolymer 8 | 120 | 0.8 |
| Ex. 19 | N,N,N',N'-tetramethylurea 2.4 [D] 177 [° C.] | 4 | Cyclohexane 0 [D] 81 [° C.] | 36 | — | — | Cyclic olefin copolymer 8 | 125 | 0.7 |
| Ex. 20 | N,N,N',N'-tetramethylethylenediamine 0.1 [D] 121 [° C.] | 4 | Cyclohexane 0 [D] 81 [° C.] | 36 | — | — | Cyclic olefin copolymer 8 | 90 | 0.9 |

TABLE 3-3

| No. | Solvent A Dipole moment Boiling point | Solvent A Parts by mass | Solvent B Dipole moment Boiling point | Solvent B Parts by mass | Other solvent Dipole moment Boiling point | Other solvent Parts by mass | Polymer compound Parts by mass | Contact angle | Friction co-efficient |
|---|---|---|---|---|---|---|---|---|---|
| Com. ex. 1 | — | — | Monochlorobenzene 0.953 [D] 131.7 [° C.] | 60 | — | — | Polycarbonate resin 12 | 75 | 1.2 |
| Com. ex. 2 | — | — | Monochlorobenzene 0.953 [D] 131.7 [° C.] | 54 | Dimethoxymethane 2.4 [D] 42.3 [° C.] | 6 | Polycarbonate resin 12 | 75 | 1.2 |
| Com. ex. 3 | — | — | Toluene 0.261 [D] 110.6 [° C.] | 26 | Dimethoxymethane 2.4 [D] 42.3 [° C.] | 14 | Polyarylate resin 4 | 77 | 1.5 |
| Com. ex. 4 | — | — | Monochlorobenzene 0.953 [D] 131.7 [° C.] | 60 | — | — | Polyarylate resin 6 | 76 | 1.5 |
| Com. ex. 5 | — | — | Cyclohexane 0 [D] 81 [° C.] | 40 | — | — | Cyclic olefin copolymer 8 | 80 | 1.0 |

As is clear from the results of Examples 1 to 16 and Comparative Examples 1 to 4, and from Examples 17 to 20 and Comparative Example 5, depending on the kind of solvent A, it is possible to form various porous surface shapes having a high contact angle and a low friction coefficient. Further, as is clear from the results of Examples 1 and 2 and Comparative Example 1, depending on the amount of solvent A, it is possible to control surface pore diameter and depth.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present application claims priority from Japanese Patent Application No. 2007-016222 which was filed on Jan. 26, 2007, which is herein incorporated by reference in its entirety.

What is claimed is:

1. A method of producing a solid body having a depressed portion on a surface, comprising:
   (a) providing a solution comprising (i) solvents consisting of a solvent A and a solvent B, and (ii) a polymer compound soluble in the solvent B, wherein
   the total mass of the solvent B is 50% or more of the total mass of the solvents consisting of the solvent A and the solvent B,
   the solvent A is diethylene glycol monomethyl ether, diethylene glycol monoethyl ether, dipropylene glycol or polyethylene glycol 200,
   the solvent B is monochlorobenzene, and the polymer compound is polyarylate resin having the following structure:
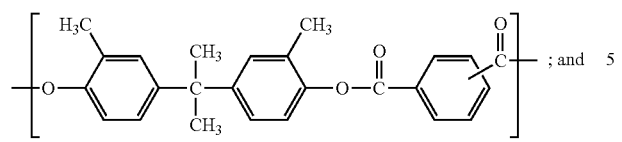 ; and
(b) solidifying the solution while forming a depressed portion on the surface of the solid body by condensation of water on the surface of the solution during a process in which either one or both of the solvent A and the solvent B contained in the solution evaporate.
* * * * *